United States Patent
Jan et al.

[11] Patent Number: 5,600,965
[45] Date of Patent: Feb. 11, 1997

[54] AIR CONDITIONING SYSTEM

[75] Inventors: Shihming N. Jan, Carlsbad; Dave J. White, San Diego, both of Calif.

[73] Assignee: Solar Turbines Incorporated, San Diego, Calif.

[21] Appl. No.: 616,144

[22] Filed: Mar. 14, 1996

[51] Int. Cl.$^6$ ............................................. F25D 9/00
[52] U.S. Cl. .................................... 62/401; 62/402
[58] Field of Search ................................. 62/401, 402

[56]       References Cited

U.S. PATENT DOCUMENTS

| | | | |
|---|---|---|---|
| 2,867,989 | 1/1959 | McGuff | 62/402 X |
| 2,884,846 | 5/1959 | Goodman et al. | 62/402 |
| 2,977,051 | 3/1961 | Farkas et al. | 62/402 |
| 3,080,728 | 3/1963 | Groves et al. | 62/401 X |
| 3,083,546 | 4/1963 | Turek | 62/402 X |
| 3,097,508 | 7/1963 | Leech et al. | 62/402 |
| 3,106,073 | 10/1963 | Kentfield | 62/402 |
| 3,326,109 | 6/1967 | Markham | 62/402 X |
| 3,470,703 | 10/1969 | Lian-Tong | 62/402 X |
| 3,623,332 | 11/1971 | Fernandes | 62/402 X |
| 3,630,138 | 12/1971 | Marcussen et al. | 62/402 X |
| 3,699,777 | 10/1972 | Rannenberg | 62/402 X |
| 3,878,692 | 4/1975 | Steves | 62/402 X |
| 4,127,011 | 11/1978 | Giles et al. | 62/402 |
| 4,493,195 | 1/1985 | Zalesak t al. | 62/402 |
| 4,535,606 | 8/1985 | Rannenberg | 62/402 |
| 5,180,278 | 1/1993 | Warner | 62/402 X |
| 5,309,724 | 5/1994 | Schreiber et al. | 62/402 X |
| 5,373,707 | 12/1994 | Ostersetzer et al. | 62/402 X |

*Primary Examiner*—Christopher Kilner
*Attorney, Agent, or Firm*—Larry G. Cain

[57]                ABSTRACT

The present air conditioning system bleeds high pressure, hot, compressed air from the compressor section of a gas turbine engine and passes the high pressure flow of air directly through a single heat exchanger, through a flow control valve, is used to drive a supersonic turbine device, exits the supersonic turbine device as a low pressure, cooled flow of air and passes through a water separator prior to being used to cool the cabin zone. The primary advantages of the improved air conditioning system includes the elimination of the necessity for pressure regulation and only one heat exchanger is required. Furthermore, the improved air conditioning system is modulely designed and allows for a more flexibility, enabling the components to be more selectively located. Furthermore, the system is considerably smaller and lighter in weight.

8 Claims, 1 Drawing Sheet

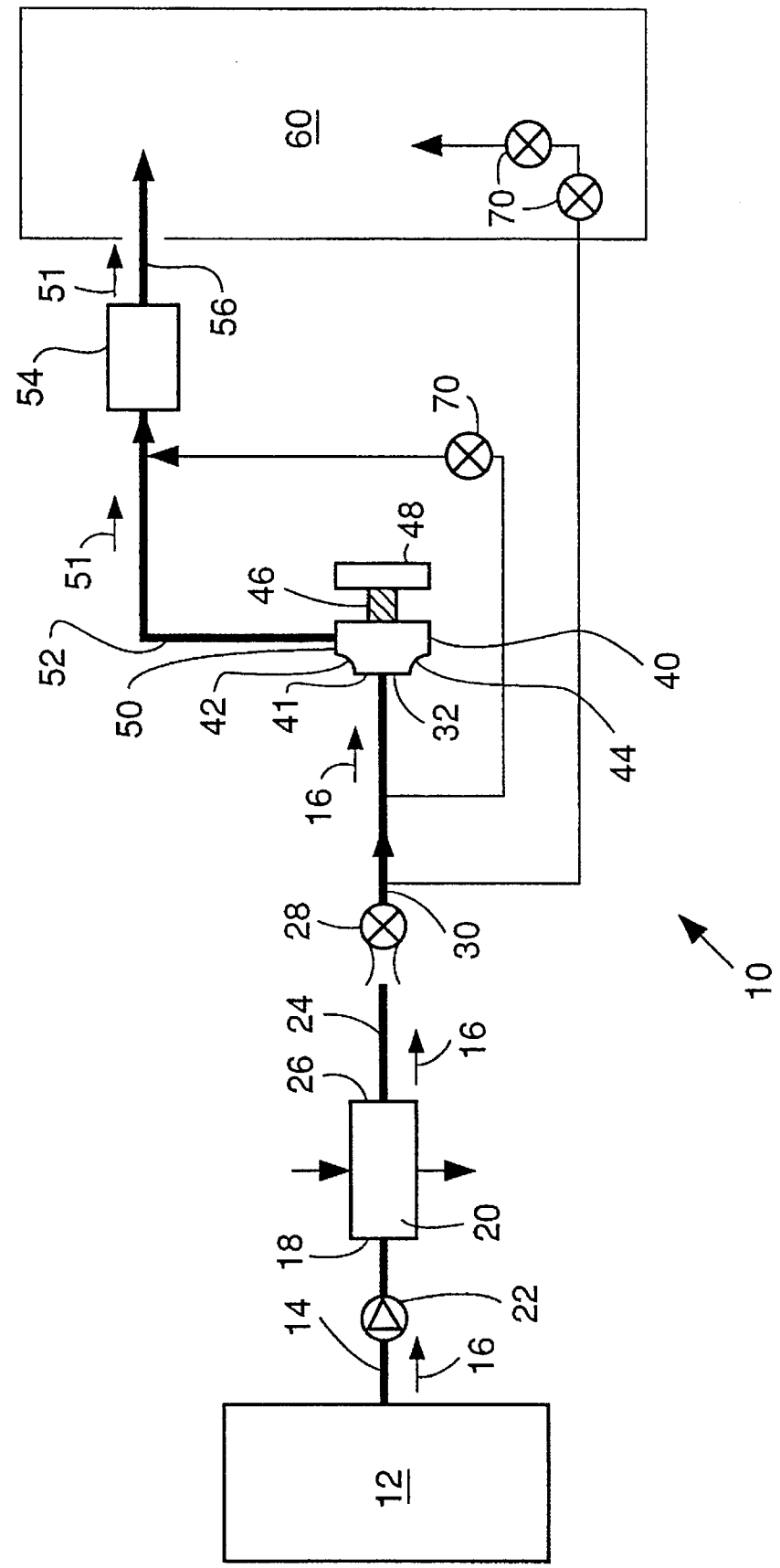

AIR CONDITIONING SYSTEM

TECHNICAL FIELD

This invention relates generally to an air-cycle air conditioning system and more particularly to an ultra light weight, compact system for use in weight and volume sensitive applications, such as aircraft.

BACKGROUND ART

Air conditioning systems have been designed for use with aircraft. Ideally, such systems are light weight and compact in size. Past systems although considered light and compact at the time of conception are by today's standards heavy, large and include a number of unneeded components. For example, one such system used with the present day aircraft uses air bleed from the aircraft's engine as the input. This air passes through a one way valve and then through a pre-cooler. The flow continues through a pressure regulating valve, and a flow control valve. The air pressure is reduced using this valving to approximately 60 psi. This pressure reduction represents a significant energy loss since the bleed pressure at the engine is much higher, often in the range of 160 psi. A compressor driven by an expansion turbine recompresses the air and delivers it to a secondary heat exchanger. After cooling takes place, the air is directed to drive an expansion turbine cooling the air further and the spent, low pressure air from the turbine unit is directed through a water separator and used for cooling the cabin zones of the aircraft. The energy (cooling) extracted from the air by the turbine is used to drive the compressor mentioned above.

The present invention is directed to overcome one or more of the problems as set forth above.

DISCLOSURE OF THE INVENTION

In one aspect of the present invention, an air conditioning system has a source which defines a flow of high pressure air, which is a compressor section of a gas turbine engine. The air conditioning system is comprised of a one way valve being in communication with the flow of high pressure air, a heat exchanger being in communication with the flow of high pressure air exiting the one way valve, a flow control valve being in communication with the flow of high pressure air exiting the heat exchanger, a supersonic turbine device having an inlet portion nozzle portion being in communication with the flow of high pressure air exiting the flow control valve. The supersonic turbine device further has an outlet portion through which the flow of spent high pressure air exits therefrom as an expanded, low pressure, cooled air, a water separator is in communication with the flow of low pressure air exiting the outlet portion of the supersonic turbine device, and a cabin zone being in communication with the flow of low pressure cooled air exiting the water separator.

BRIEF DESCRIPTION OF THE DRAWINGS

FIG. 1 is a generally schematic view of the present invention.

BEST MODE FOR CARRYING OUT THE INVENTION

Referring to FIG. 1, an air conditioning system 10 is shown being constructed of a plurality of modular components. A gas turbine engine 12 is schematically represented to the far left of the schematic. A first conduit 14 is connected to the gas turbine engine 12 and transfers a flow of compressed, high pressure and hot air, represented by the arrow 16, bled from a conventional compressor section of the gas turbine engine 12. The other end of the first conduit 14 is connected to an inlet portion 18 of a heat exchanger 20 of conventional design. The heat exchanger 20 in this application is of a surface to surface design. A one way valve 22 is positioned in the first conduit 14 and is interposed the gas turbine engine 12 and the heat exchanger 20. A second conduit 24 is connected to an outlet portion 26 of the heat exchanger 20 and the other end of the second conduit 24 is connected to a flow control valve 28. A third conduit 30 communicates between the flow control valve 28 and an inlet portion 32 of a supersonic turbine device 40. The supersonic turbine device 40 includes, a supersonic nozzle portion 41 and a turbine wheel 42 having a plurality of impulse blades 44 thereon. The turbine wheel 40 is attached to a shaft 46 and the shaft 46 is connected to an accessory 48, such as a high speed alternator. In this application, the high speed alternator, when operating, generates a high frequency electric current which is rectified to direct current and used to power other equipment in the air craft.

Attached to an outlet portion 50 of the supersonic turbine unit 40 is a fourth conduit 52. The high pressure, hot compressed air 16 after passing through the turbine wheel 42 results in a spent high pressure air exiting therefrom as and expanded, low pressure, cooled air 51. The other end of the fourth conduit 52 is attached to a water separator 54. A fifth conduit 56 communicates between the water separator and a cabin zone 60 schematically represented to the right of the schematic. Other monitors 70 are shown to complete the control of the systems operation.

Thus, the primary advantages of the improved air conditioning system 10 includes the elimination of the necessity for pressure regulation by reduction and only one heat exchanger is required. Furthermore, the improved air conditioning system 10 is modular designed and allows for a more flexible mounting which can be more selectively located. Because of the higher operating pressure and turbine speeds the air conditioning system 10 is considerably smaller and lighter in weight.

INDUSTRIAL APPLICABILITY

In operation, the air conditioning system 10 is adaptable for use with an aircraft having a gas turbine engine 12, such as the cabin zone 60 of a helicopter. The gas turbine engine 10 is started and the compressor section develops a flow of high pressure, hot, compressed air 16. A portion of the flow of high pressure, hot, compressed air 16 is bleed from the compressor section and passes through the first conduit 14 to the inlet portion 18 of a heat exchanger 20. As the high pressure, hot, compressed air 16 passes through the heat exchanger 20 heat is dissipated to the gaseous cooling media, which in this application is air ducted from the cabin zone 60. The air 16 exiting the outlet portion 26 of the heat exchanger 20 has been cooled and is directed to a flow control valve 28. The temperature of air 16 desired to cool the cabin zone 60 is controlled by the flow control valve 28 and is in turn directed to the inlet portion 32 of the turbine device 40. The flow of air 16 enters the nozzle portion 41 wherein the velocity of the flow of air 16 is increased to a supersonic velocity and in so doing drops the bleed pressure to near cabin pressure. The resulting velocity of the flow of air 16 drives the supersonic turbine wheel 40 and the shaft 46 is rotated driving the accessory 48, which is a high speed alternator. The combination of the nozzle portion 41 and the plurality of blades 44 are so related to enable a change in the velocity across the plurality of blades 44. After losing most of the airs energy, primarily due to the nozzle portions 41 more efficient driving of the turbine wheel 40, the spent low pressure, cool air 51 is directed to a water separator 54. Within the water separator 54 the high humidity is removed. From the water separator 54 the air 16 is directed to the cabin zone 60 and used to cool the operator and/or occupants of the cabin.

The design of the modules enhances the usefulness of the air conditioning system 10 by allowing the individual modules to be located wherever the space is available. Furthermore, the size of the air conditioning system, being smaller than typical past systems enhances the usefulness. The weight of the system is about half of typical past systems and decreases the aircraft weight.

Other aspects, objects and advantages of this invention can be obtained from a study of the drawings, the disclosure and the appended claims.

We claim:

1. An air conditioning system having a source defining a flow of high pressure air being a compressor section of a gas turbine engine comprising:

a one way valve being in communication with said flow of high pressure air;

a heat exchanger being in communication with said flow of high pressure air exiting the one way valve;

a flow control valve being in communication with said flow of high pressure air exiting said heat exchanger;

a supersonic turbine device having an inlet portion defining a nozzle portion being in communication with said flow of high pressure air exiting the flow control valve, said supersonic turbine device further having an outlet portion through which a flow of spent high pressure air exits therefrom as an expanded, low pressure, cooled air;

a water separator being in communication with said flow of low pressure air exiting the outlet portion of the supersonic turbine device; and a cabin zone being in communication with the flow of low pressure cooled air exiting the water separator.

2. The air conditioning system of claim 1 wherein said heat exchanger has a gaseous cooling agent flowing therethrough.

3. The air conditioning system of claim 2 wherein said heat exchanger is a primary surface heat exchanger.

4. The air conditioning system of claim 1 wherein said supersonic turbine device has an accessory attached thereto in driving relationship.

5. The air conditioning system of claim 4 wherein said accessory is an alternator.

6. The air conditioning system of claim 5 wherein said alternator is a high speed alternator.

7. The air conditioning system of claim 1 wherein said nozzle portion is a supersonic nozzle.

8. The air conditioning system of claim 1 wherein said supersonic turbine device includes a turbine wheel having a plurality of blades being impulse blades.

* * * * *